United States Patent [19]

DeLew et al.

[11] Patent Number: 4,621,788
[45] Date of Patent: Nov. 11, 1986

[54] SOLENOID VALVE

[75] Inventors: Charles A. DeLew, Des Plaines; Edwin A. Ostrowski, Mt. Prospect, both of Ill.

[73] Assignee: Controls Company of America, Schiller Park, Ill.

[21] Appl. No.: 763,369

[22] Filed: Aug. 7, 1985

[51] Int. Cl.[4] .................. F16K 31/06; F16K 47/08
[52] U.S. Cl. .................. 251/120; 251/129.21
[58] Field of Search ............. 251/129.21, 120

[56] References Cited

U.S. PATENT DOCUMENTS 3,529,806  9/1970  Kozel ................. 251/129.21

FOREIGN PATENT DOCUMENTS 149791  10/1951  Australia ................. 251/120
643262   9/1950  United Kingdom ............ 251/120

Primary Examiner—Arnold Rosenthal
Attorney, Agent, or Firm—David L. Davis; Robert E. Smith; Edward L. Bell

[57] ABSTRACT

A solenoid valve of the type having a molded one-piece plastic valve body including a housing for a flow rate control member, a guide tube for the solenoid armature and a valve seat. A molded plastic insert is provided which functions to retain the flow rate control member and limit the armature stroke to prevent chattering when the solenoid is energized with no liquid present.

5 Claims, 2 Drawing Figures 4,621,788

SOLENOID VALVE

BACKGROUND OF THE INVENTION

This invention relates to solenoid valves and, more particularly, to an improved valve of the type wherein a single molded plastic body element is configured to form an inlet connection, a guide tube for the solenoid armature, a valve seat, and an outlet.

U.S. Pat. No. 3,529,806, to Kozel, discloses a solenoid valve which includes a molded one-piece plastic valve body having at one end a relatively large diameter cup-shaped housing and a relatively small diameter elongated tubular extension formed integrally with and projecting outwardly from the housing. A valve seat is formed within the extension and the extension acts as a guide tube for the solenoid armature, with the solenoid coil surrounding the extension. Fluid enters the valve through the cup-shaped housing which has therein a resilient deformable flow rate control member. A first metal insert press fit within the cup-shaped housing acts as a seat for the flow control member and as a stop for a spring which biases the plunger toward the valve seat. A second metal insert press fit within the cup-shaped housing on the other side of the flow control member from the first metal insert acts as a support for a filter screen. This design is disadvantageous in that swelling of the plastic body or shavings produced during insertion of the metal inserts can result in undesirable loosening of the parts, resulting in poor flow control and/or bypass leakage.

It is therefore a primary object of this invention to provide a solenoid valve of the type described which does not have the disadvantages enumerated above.

A particular application of the above-described valve is in an ice cube maker of a refrigerator. If the consumer energizes the refrigerator and neglects to turn on or connect a water supply to the valve, when the valve is energized the plunger will pass magnetic neutral and then accellerate backwards, impacting and chattering against the valve seat. This significantly reduces the life of the valve as well as producing undesirable noise.

Accordingly, it is another object of this invention to eliminate plunger "chattering" when the valve is energized with no liquid present.

SUMMARY OF THE INVENTION

The foregoing, and additional objects are attained in accordance with the principles of this invention by providing a valve of the type described with a molded plastic insert disposed within the cup-shaped housing, the insert having a cup-shaped portion and a tubular extension, the cup-shaped portion adapted to contain the flow rate control member and the tubuar extension of the insert extending into the tubular extension of the valve body a sufficient distance to limit the travel of the armature plunger so that the plunger does not pass magnetic neutral when the coil is energized.

In accordance with an aspect of this invention, the cup-shaped portion of the insert is formed with an internal overhang to retain the flow rate control member therein.

In accordance with another aspect of this invention, the insert snaps into the valve body.

In accordance with a further aspect of this invention, the rim of the insert is of sufficient width to provide support for the filter screen.

In accordance with yet another aspect of this invention, the insert is provided with a peripheral bead around its major diameter which will seal against the valve body and eliminate any bypass flow around the flow rate control member.

BRIEF DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

Figure 1:
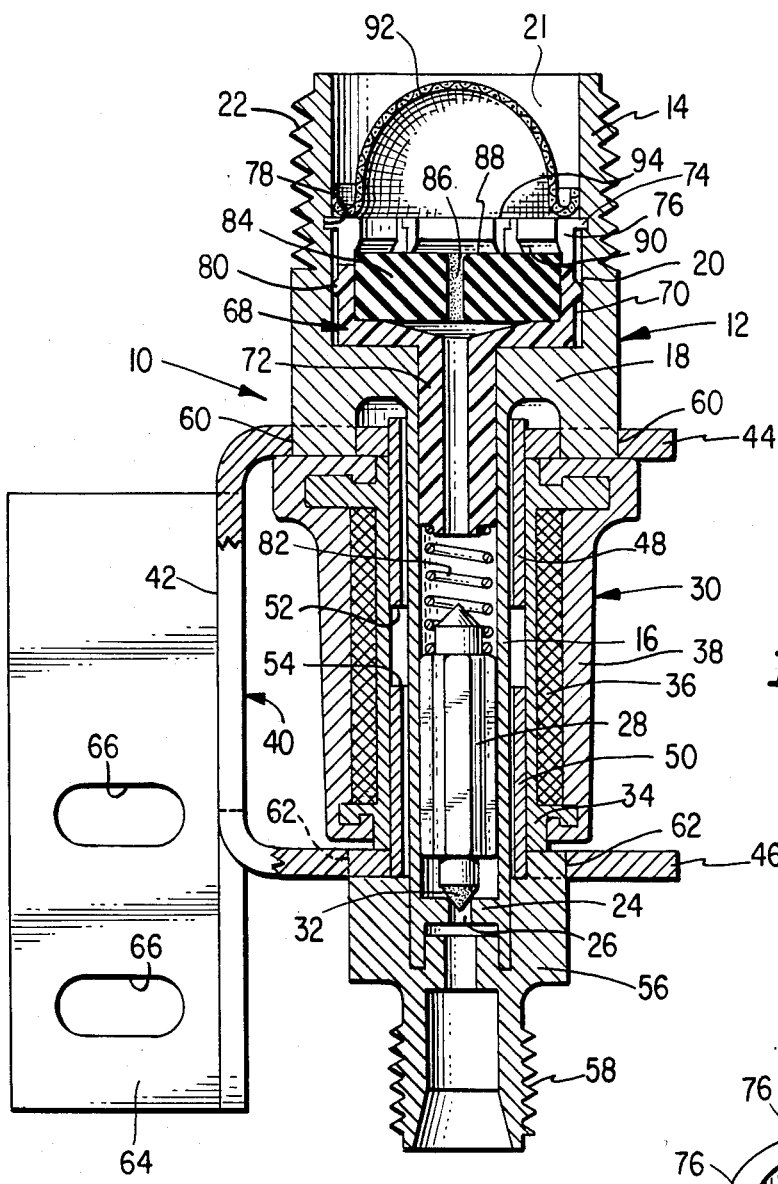
FIG. 1 is a longitudinal sectional view taken through a valve constructed in accordance with this invention.
Figure 2:
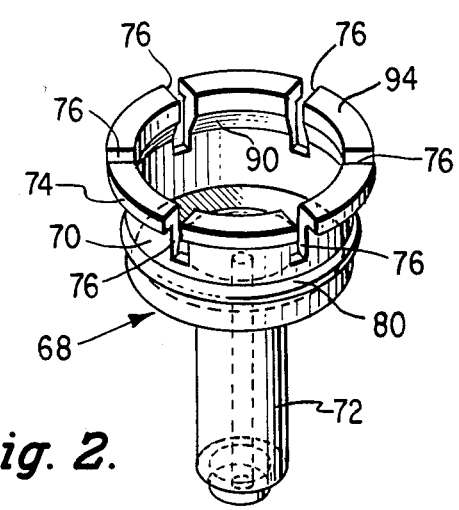
FIG. 2 is a perspective view of the insert according to this invention.

Referring now to FIG. 1, shown therein is a solenoid valve designated generally by the reference numeral 10 which is similar in construction to the valve disclosed in the aforementioned Kozel patent. Thus, the valve 10 includes a molded one-piece plastic valve body 12 having a cup-shaped housing 14 and an elongated tubular extension 16. The housing 14 comprises a back wall 18 and an annular side wall 20 which defines an open mouth 21 for receiving liquid from a supply line (not shown). In order to couple the valve 10 to the supply line, the outer surface of the wall 20 is threaded as at 22.

The tubular extension 16 is of cylindrical cross-section and is formed with an inwardly radiating flange 24 with a central opening 26 to provide a valve seat for the plunger armature 28. The plunger armature 28 is formed of magnetically permeable material and is of non-circular cross-section to permit liquid to pass from the housing 14, through the tubular extension 16, and through the opening 26 when the solenoid coil 30 is energized. Illustratively, the plunger armature 28 is formed with a fluted cross-section, but other cross-sections may be employed. The plunger armature 28 includes a convergent elastomer tip 32 which is adapted to seal the opening 26 to prevent liquid flow thereto.

The illustrated solenoid coil 30 comprises a plastic bobbin 34 around which is wrapped a coil of electrical wire 36, the ends of which are connected to electrical terminals (not shown). The completed coil is then encapsulated in a plastic sheath 38.

To provide a magnetic circuit for the flux produced by the wire coil 36, there is provided a magnetically permeable U-frame 40 having a web wall 42, a first flange 44 and a second flange 46. Each flange is provided with a circular opening for press fit reception of a magnetically permeable sleeve 48 or 50, the sleeves having their inner ends 52 and 54 terminating short of each other to define a centering gap to be bridged by the armature 28 when the wire coil 36 is energized. Thus, when the coil is energized, a magnetic flux path or circuit is established from sleeve 48 to flange 44, web wall 42, flange 46, sleeve 50 and aramture 28. The magnetic flux tends to draw the armature 28 upwardly toward a position centered with respect to the gap between the sleeve ends 52 and 54, this position being referred to as magnetic neutral.

The end of the tubular extension 16 is fit within an outlet piece 56 and then sonically welded thereto. As illustrated, the outlet piece 56 has external threads 58, but depending upon the desired connection, the outlet piece 56 can have any desired configuration.

To prevent the valve body 12 from turning with respect to the frame 40 when connections are made to the threads 22 and 58, the valve body 12 is formed with a number of projections 60 and the outlet piece 56 is likewise formed with a number of projections 62. The projections 60 and 62 mate with complementary openings formed in the flanges 44 and 46. To mount the entire valve assembly, the frame 40 is formed with a plate-like extension 64 having one or more apertures 66 which receive mounting screws (not shown) for fixing the valve 10 onto a support structure.

In accordance with this invention, a multi-purpose plastic insert 68 is provided. The insert 68 is disposed within the housing 14 and is formed with a cup-shaped portion 70 and a tubular extension 72. The cup-shaped portion 70 is formed with an outwardly projecting lip 74 and is slotted in a number of places as at 76 so that resilient tabs are formed. The inner wall of the cup-shaped housing 14 is formed with an annular groove 78 so that when the insert 68 is inserted into the valve body 12, the lip 74 is first moved inwardly and then allowed to snap out to be retained by the groove 78. Further, the outer wall of the cup-shaped portion 70 is formed with a perpherial bead 80 which under a press fit of the insert 68 into the housing 14 acts as a seal for preventing liquid from flowing around the insert 68.

The tubular extension 72 of the insert 68 extends into the tubular extension 16 of the valve body 12. A coiled compression spring 82 has one end engaged against the armature 28 and its other end engaged against the end of the tubular extension 72. The spring 82 acts to return the armature 28 to the illustrated valve-closed position when the coil 36 is not energized. The length of the tubular extension 72 is carefully chosen so that it extends into the tubular extension 16 of the valve body 12 a sufficient distance to limit the travel of the plunger 28 so that the plunger does not pass the centering gap between the sleeves 48 and 50 when the coil 36 is energized. If the plunger 28 were allowed to pass magnetic neutral when the coil 36 is energized, under conditions where no liquid was present to damp the motion of the plunger 28, the plunger 28 would subsequently accellerate backwards and impact upon the flange 24, causing chattering and significantly reducing the life of the elastomer tip 32.

To control the rate of flow in spite of varying liquid supply pressures, there is provided a conventional elastomeric resilient flow control member 84 which is formed with a central flow opening 86 which progressively decreases in size as the liquid pressure increases on the upstream face 88. The insert 68 is formed with an internal overhang 90 to retain the flow control member 84. To prevent contaminants from interferring with the action of the valve, there is provided a filter screen 92, illustratively formed of wire mesh and configured as a hat-shaped element. The filter screen 92 is press fit into the cup-shaped housing 14. The rim 94 of the insert 68 is designed to be sufficiently wide to provide support for the screen 92.

The disclosed improvement possesses a number of advantages. A single insert 68 replaces at least two metal parts. Thus, no shavings are produced during assembly. Preferably, the insert 68 is molded of the same material as the valve body 12, thus providing equal thermal expansion. The peripheral bead 80 prevents any leakage around the flow control member 84. The tubular extension 72 eliminates plunger chattering and destruction of the plunger elastomer tip when the valve is energized with no liquid present. Providing for the flow control member 84 to be retained within the insert 68 allows it to be stocked as a subassembly, color coded for various flow requirements.

Accordingly, there has been disclosed an improved solenoid valve assembly. It is understood that the above-described embodment is merely illustrative of the application of the principles of this invention. Numerous other embodiments may be devised by those skilled in the art without departing from the spirit and scope of this invention, as defined by the appended claims.

We claim:

1. A solenoid valve comprising:

a molded one-piece valve body, said body including a relatively large diameter cup-shaped housing having an annular side wall, a back wall, and an open inlet mouth for admitting liquid into the housing interior, said body also including a relatively small diameter elongated tubular extension formed integrally with and projecting outwardly from the housing back wall on the housing axis for receiving liquid from the housing interior, said body also including a single annular valve seat formed within the tubular extension as an integral part thereof, said valve seat being formed as an inwardly radiating flange adjacent the end of the tubular extension remote from the cup-shaped housing;

a movable valve element cooperable with said valve seat to control liquid flow through the tubular extension, said valve element comprising an elongated armature plunger slidably positioned within the tubular extension in the space between the cup-shaped housing and the valve seat, said armature plunger being cross-sectioned to permit liquid to pass from the housing through the valve seat when the armature is axially spaced from the valve seat;

a solenoid coil magnetic frame assembly telescoped onto the tubular extension in the area thereof between the housing and the valve seat, said frame comprising a U-frame member having a web wall paralleling the tubular extension and two flanges lying against the ends of the coil, said frame further comprising magnetically permeable sleeves extending axially from the frame member flanges into the coil in surrounding relation to the tubular extension, said sleeves terminating short of one another to define a centering gap to be bridged by the armature when the coil is energized, said armature being dimensioned so that movement thereof to a position bridging the magnetic gap causes said armature to open the flow path through the valve seat; and a resilient deformable flow rate control member disposed within the cup-shaped housing to regulate the liquid flow therethrough;

wherein the improvement comprises:

a molded plastic insert disposed within the cup-shaped housing, the insert having a cup-shaped portion and a tubular extension, the cup-shaped portion adapted to contain the flow rate control member and the tubular extension of said insert extending into the tubular extension of said valve body a sufficient distance to limit the travel of said armature plunger so that said plunger does not pass said centering gap when the coil is energized.

2. The improvement according to claim 1 wherein the cup-shaped portion of said insert is formed with an internal overhang to retain the flow rate control member.

3. The improvement according to claim 1 wherein said cup-shaped housing is formed with an internal annular groove and said cup-shaped portion of said insert is formed with an outwardly projecting annular lip, said cup-shaped portion being axially slotted through said lip to form resilient tabs including said lip, wherein said lip snaps into said groove when said insert is inserted within said valve body.

4. The improvement according to claim 1 wherein said insert is formed with a peripheral bead adapted to provide a liquid seal between the exterior of said cup-shaped portion and the interior of said cup-shaped housing.

5. The improvement according to claim 1 wherein the rim of said insert is of sufficient width to support a filter screen thereon.

* * * * *